May 18, 1943 B. WELTE Re. 22,318

HYDRAULIC BROACHING MACHINE

Original Filed April 22, 1938 5 Sheets-Sheet 1

INVENTOR

Benedict Welte.

BY

Harness, Dickey & Pierce.

ATTORNEYS.

May 18, 1943 B. WELTE Re. 22,318

HYDRAULIC BROACHING MACHINE

Original Filed April 22, 1938 5 Sheets-Sheet 2

INVENTOR

Benedict Welte

BY

Harness, Dickey & Pierce.

ATTORNEYS.

May 18, 1943 B. WELTE Re. 22,318

HYDRAULIC BROACHING MACHINE

Original Filed April 22, 1938 5 Sheets-Sheet 3

INVENTOR
Benedict Welte.
BY
Harness, Dickey & Pierce.
ATTORNEYS.

May 18, 1943 B. WELTE Re. 22,318

HYDRAULIC BROACHING MACHINE

Original Filed April 22, 1938 5 Sheets-Sheet 4

INVENTOR

Benedict Welte.

BY

Harness, Dickey & Pierce.

ATTORNEYS.

HYDRAULIC BROACHING MACHINE

Original Filed April 22, 1938 5 Sheets-Sheet 5

INVENTOR
Benedict Welte.
BY
Harness, Dickey & Pierce.
ATTORNEYS.

Reissued May 18, 1943

Re. 22,318

UNITED STATES PATENT OFFICE 22,318

HYDRAULIC BROACHING MACHINE

Benedict Weite, Lake Orion Township, Oakland County, Mich., assignor to Colonial Broach Company, Detroit, Mich., a corporation of Delaware Original No. 2,256,332, dated September 16, 1941, Serial No. 203,654, April 22, 1938. Application for reissue June 2, 1942, Serial No. 445,499

27 Claims. (Cl. 90—33)

This invention relates to hydraulic circuits and the control valves therefor.

The main objects of this invention are to provide a hydraulic circuit control for a machine having three hydraulic cylinders which are required to move through a continuous cycle; to provide a hydraulic circuit control for three hydraulic cylinders where two of the cylinders may be for broaching rams and the third cylinder for moving the work supports toward and away from the respective broaches; to provide a positive interlock between the movements of the cylinders which makes it impossible to move either of the broaching cylinders simultaneously with the movement of the work shifting cylinder; to provide an arrangement in which the hydraulic cylinders of the main circuit are automatically prefilled to compensate for any loss of oil; to provide an arrangement in which the pre-fill of the two main cylinders is completed before movement of the third or work shifting cylinder is possible; to provide a quick and positive stop of all moving members in case of emergency; to provide an arrangement in which the moving parts may be returned to starting position following an emergency stop, and to provide an arrangement in which the last moving part is the first to return to its starting position after an emergency stop followed by reversing.

An illustrative embodiment of this invention is shown in the accompanying drawings, in which.

Figure 6:
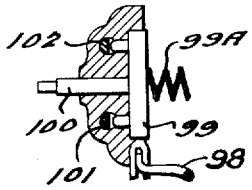

Fig. 6 is an enlarged, sectional, detail view, showing how the lever 99 may be released from connection with the control plungers 101 and 102.

In the drawings, which are somewhat diagrammatic, a main hydraulic fluid pump 5 and secondary hydraulic fluid pump 6 are driven by an electric motor 7. Fluid is supplied to the pumps from a reservoir 8 through an intake conduit 9 having branches 10 and 11 to the pumps 5 and 6, respectively.

The main fluid pump 5 discharges through a conduit 12, a pressure relief valve 13, and conduit 14, into a port 15 of a primary control valve, generally designated 16. The valve 13 may be any desired form of pressure relief valve, such as the conventional form illustrated and described in connection with valve 49 hereinafter. It differs from the valve 49 only in that it omits the pilot line control of the valve 49.

The primary control valve 16 comprises a casing having a cylindrical bore 17 therethrough in which is axially slidable a valve spool 18. The spool 18 comprises a plurality of bore fitting, cylindrical, axially spaced, lands 19, 20, 21, 22, 23 and 24 joined by reduced neck portions which permit the passage of fluid axially within the limits of any two lands. The interior wall of the bore 17 is provided with axially spaced, encircling grooves or ports 15, 25, 26, 27, 28, 29 and 30, which are positioned so as to be controlled by the lands of the spool 18.

One end of the valve spool 18 is formed to provide a spring centering means comprising an integrally formed, axially extending rod 31, surrounded by a helical compression spring 32, the opposite ends of which bear against washers 33 and 34 which are slidable on the rod 31. The outer end of the rod 31 has a set collar 35 rigidly fixed thereon, washers 33 and 34 and collar 35 are all of slightly smaller diameters than the bores in which they fit with the result that oil may flow around them. In addition, washers 33 and 34 are provided, respectively, with auxiliary holes 33A and 34A adapted to permit the flow of oil through them from one side of the washers to the other. The casing of the valve 16 is provided with a shoulder 36 against which the floating washer 34 abuts, and an end wall plate 37 against which the floating washer 33 abuts, after the usual manner of spring centering devices of this character. Ports 25 and 28 of the main control valve 16 are connected by lines 25A and 28A to a fluid return line 55, and port 29 is also connected to the return line 55 through a by-pass valve 29A, which operates to permit flow from port 29 to line 55 when the pressure in port 29 exceeds a predetermined value. The by-pass valve 29A may be of any conventional form, such as that illustrated and described in connection with valve 47 hereinafter.

The ports 26 and 27 of the valve 16 have primary pressure line conduits 38 and 39 communicating therewith, hereinafter referred to as the primary circuit, which conduct fluid under pressure to and from a pair of vertically disposed hydraulic broaching tool or work performing cylinders 40 and 41, respectively, through manifolds 42 and 43, respectively. The lines 38 and 39 pass through pistons 38A and 39A, respectively, so as to introduce fluid into their respective cylinders below the pistons in order to force the cylinders downwardly.

Fluid discharged under pressure from the secondary pump 6 passes through a line 44 to branch lines 45 and 46. The line 45 connects through a by-pass valve 47 and line 48 to a pressure relief valve 49, thence through a line 50 to a fluid pressure operated four-way secondary control valve 51. The relief valve 49 is connected to a fluid return line 54 by a line 49A. The secondary valve 51 has pressure working lines 52 and 53 connected thereto, hereinafter referred to as the secondary circuit, and a fluid return line 54, which connects with a fluid return line 55. The line 55 leads to and discharges into the tank or reservoir 8.

The function of the by-pass valve 47 is to prevent the flow of fluid under pressure to line 48 until the pressure in lines 44 and 46 reaches a predetermined value, as pointed out hereinafter. The valve 47 is a conventional form of pressure responsive by-pass valve having a spool 47A adapted to control communication between ports connected to lines 45 and 48. The spool is normally urged toward the right, as viewed in Figure 1, by an adjustable spring 47B, in which position the lefthand land on the spool closes communication between lines 45 and 48. The valve body, however, contains a small passage 47C connecting the port associated with line 45 to the valve bore at the righthand end of the spool 47A, with the result that the pressure in line 45 constantly acts on the righthand end of the spool, urging it to the left in opposition to the spring 47B. When this pressure reaches a value sufficient to overcome the force of the spring, the valve opens and permits flow from line 45 to line 48. When the pressure drops below that value, the spring closes the valve.

The valve 49 is a conventional form of pressure relief valve which functions to connect lines 48 and 50 to the low pressure tank, or reservoir, 8 under certain conditions. The valve is provided with a spool 49B adapted when it shifts to the right, as viewed in Figure 1, to close the port in communication with the discharge line 49A. This spool is normally urged in a direction to close the port associated with line 49A by a spring 49C. The spool is provided with a piston 49D which fits the bore of the valve body and which is subject at one side to the pressure in the lines 48 and 50. The piston 49D, however, has a small bleed opening 49E therethrough which serves normally to balance the pressures on opposite sides of the piston. The lefthand end of the spool 49B fits in a spring bore of the housing, and the space at the lefthand side of the piston 49D is adapted to be connected to this spring bore by a passageway containing a spring-pressed ball valve 49G. The valve 49G normally closes communication through this passageway. The spring bore in the body is also connected to the discharge line 49A through a bore 49F through the spool 49B. The space within the valve body at the lefthand side of the piston 49D is also connected to a pilot line 200. The operation of the valve is as follows:

Spring 49C normally shifts the spool 49B into a position in which it closes the port connected with the discharge line 49A. When the discharge port is closed, there is free communication between lines 48 and 50, and the pressure at the righthand side of the piston 49D is balanced by reason of the fact that the same pressure is transmitted through the bleed opening 49E to the opposite side of the piston. Under normal operating conditions, the pressure in lines 48 and 50, which pressure acts through the bleed opening 49E, is insufficient to lift the spring-pressed ball valve 49G off its seat. However, if the pressure in lines 48 and 50 exceeds a predetermined amount sufficient to raise ball valve 49G, the fluid at the lefthand side of the piston 49D flows past the valve 49G to the spring housing at the lefthand end of the body and thence through the valve spool bore 49F to the discharge line 49A. This causes a drop in pressure at the lefthand side of the piston 49D, because the flow through the bleed opening 49E is restricted. As a result, the pressure acting on the righthand side of piston 49D opens the valve and vents the lines 49 and 50 to the reservoir 8. The same result may be effected at any time by connecting the pilot line 200 to the reservoir, since this likewise lowers the pressure at the lefthand side of piston 49D causing the valve to open the port connected with the discharge line 49A.

The valve 51 is a conventional pilot operated four-way valve having a valve spool provided with three lands adapted to control the ports in communication with the lines 50, 52, 53 and 54. When the spool is in the position shown in Figure 1 of the drawings, free flow is permitted from the pressure line 50 to the line 52 through the space between the lefthand and central lands on the spool. At the same time, return flow is permitted from line 53 to line 54 through the space between the central and righthand lands on the valve spool. When the spool is in its lefthand position, free flow of pressure is permitted from line 50 to line 53 through the space between the central and righthand lands on the spool, and at the same time return flow is permitted from line 52 to line 54 through the space between the central and lefthand lands on the spool. The position of the valve spool is controlled at all times by pilot pressure admitted through lines 202 and 203 to the ends of the spool bore. In the position shown in Figure 1, pressure is applied through line 202 to shift and hold the spool to the right, and line 203 is connected to the reservoir.

The secondary circuit lines 52 and 53 are connected to axially aligned, integrally formed, hollow piston rods 56 and 57 of a work moving hydraulic cylinder 58 which is disposed transversely with respect to the work performing cylinders 40 and 41. The cylinder 58 is adapted to be connected to a pair of work supporting fixtures, or the like, for alternately moving work toward and away from the broaching or work performing cylinders 40 and 41. Fluid from the lines 52 and 53 passes out through apertures 59 and 60 formed in the hollow piston rods 56 and 57, respectively, closely adjacent to a stationary piston 61 upon which is slidable the cylinder 58, it being understood that the piston rods 56 and 57 are plugged between the apertures 59 and 60 so as to prevent fluid from passing from one line to the other.

The details of construction of the work moving cylinder 58 and the work performing cylinders 40 and 41, with the machine in which they are mounted, are shown in the joint application of applicant and Albert H. Werden, Serial No. 199,756, filed April 4, 1938, issued December 17, 1940, as Patent No. 2,225,191, and assigned to the assignee of this invention.

The line 46 carries fluid through a branch line 62 to a control valve, generally designated 63, and through a branch line 64 to a control valve generally designated 65. The control valve 63 is provided with a cylindrical bore 66 in which is axially slidable a valve spool 67. The spool 67 is provided with bore fitting, cylindrical, axially spaced, lands 68, 69, 70 and 71, connected by reduced neck portions which permit the flow of fluid axially between the lands in the usual manner.

The cylindrical bore 66 has its interior wall provided with axially spaced, encircling ports 72, 73, 74, 75 and 76, which are positioned so as to be controlled by the lands of the spool 67. The spool 67 is provided at one end with an integrally formed, axially extending rod 77 which, through a lever 78, is connected to a spring centering device 79.

The spring centering device 79 comprises a collar 80, helical compression springs 81 and 82 which bear against opposite sides of the collar 80 and the respective ends of a stationary housing. The collar 80 is secured to a rod 83 which passes axially through the housing and which is connected to one end of a lever 84, the other end of which is in position to be engaged by depending lugs 85 and 86 carried by the hydraulic cylinder 58.

Ports 72 and 76 of the control valve 63 are connected by branch lines 87 and 88, respectively, to a fluid return line 89 which empties into the return line 55, and thence into the reservoir 8.

Figure 5:
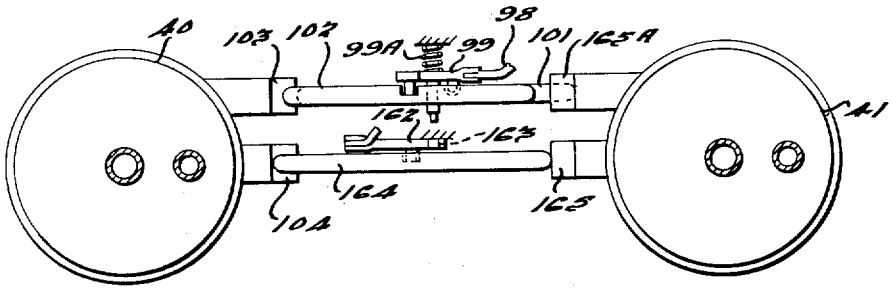
Fig. 5 is a fragmentary section taken along the line 5—5 of Figure 1.

The control valve 65 is provided with a cylindrical bore 90 in which is axially slidable a valve spool 91. The spool 91 comprises bore fitting, axially spaced, cylindrical lands 92, 93, 94 and 95, which are connected by reduced neck portions in the usual manner. One end of the valve spool is provided with an integrally formed, axially extending rod 96, the outer end of which is pivotally connected to one end of a lever 97, the other end of which is connected to one end of a control rod 98. The other end of the rod 98 is connected to one end of a lever 99 which is rockable on an axially slidable pivot 100. As best shown in Figs. 5 and 6, the lever 99, at points equidistantly spaced at opposite points of the pivot 100, is detachably connected to plungers 101 and 102, which are positioned to contact lugs 103 and 165A, carried by the main broaching cylinders 40 and 41, respectively, for shifting the plungers to rock the lever 99, and thereby through the links, move the spool 91 axially in its bore. The lever 99 is normally held in engagement with the plungers 101 and 102 by a compression spring 99A.

It is to be understood that the drawings are diagrammatic to a great extent inasmuch as the elements involved are well known to those skilled in the art. The plunger 102 is shorter than the plunger 101, and when the plunger 102 is contacted and moved by the lug 103, the linkage moves to a central position, at which time both ends of the plunger 101 protrude slightly beyond the ends of the plunger 102 so that the cam lug 165A may pass by the ends of the plunger 102 but will contact and move the plunger 101 to the opposite position.

The lugs 165 and 104 and the plunger 164 are all in the same vertical plane, which is offset from a common vertical plane which contains lug 165A, lug 103, plungers 101 and 102. The width of lug 104 and also the length of plunger 164 must be such that when lug 104 comes opposite to plunger 164, it will be shifted to the right an equal amount as it is shown to the left now.

The interior wall of the cylindrical bore 90 of valve 65 is provided with axially spaced, encircling port grooves 105, 106, 107, 108 and 109, which are positioned so as to be controlled by the lands of the spool 91. The ports 105 and 109 communicate with the fluid return line 89 through lines 110 and 111, respectively.

The ports 73 and 75 of valve 63 are connected to lines 112 and 113, respectively, which conduct fluid to and from a control valve, generally designated 114. Control valve 114 is provided with a cylindrical bore 115 in which is axially slidable a valve spool 116, which has bore fitting, cylindrical, axially spaced lands 117, 118, 119 and 120 connected by reduced neck portions in the usual manner. One end of the spool 116 is provided with an integrally formed, axially extending rod 121, the outer end of which is pivoted to the outer end of an arm 122 of a bell crank lever rockable on fixed pivot 123. The other arm 124 of the bell crank lever is connected to one end of a link 125 by a slot and pin connection 126. The other end of the link 125 is pivoted to the outer end of an arm 127 which is integrally formed on the lever 97.

The interior wall of the bore 115 of valve 114 is provided with axially spaced, circling port grooves 128, 129, 130, 131 and 132, which are positioned so as to be controlled by the lands of the spool 116. The ports 129 and 131 are connected to lines 133 and 134, respectively, which lead to a manually operable control valve generally designated 135.

The valve 135 is provided with a cylindrical bore 136 in which is axially slidable a valve spool 137. The spool 137 comprises bore fitting, axially spaced, cylindrical lands 138, 139 and 140, which are connected by reduced neck portions in the usual manner. One end of the spool 137 is provided with an integrally formed axially extending rod 141, the outer end of which is rigidly connected to a cross head 142.

The interior wall of the bore 136 of valve 135 is provided with axially spaced, encircling port grooves 143, 144, 145, 146 and 147, which are positioned so as to be controlled by the lands of the spool 137. The ports 143 and 147 are connected to lines 148 and 149 respectively, which join in line 150. The line 150 leads to and conducts fluid to the control valve 16 at the right-hand end thereof, the communication being to that part of the valve casing which houses the valve centering means.

Figure 1:
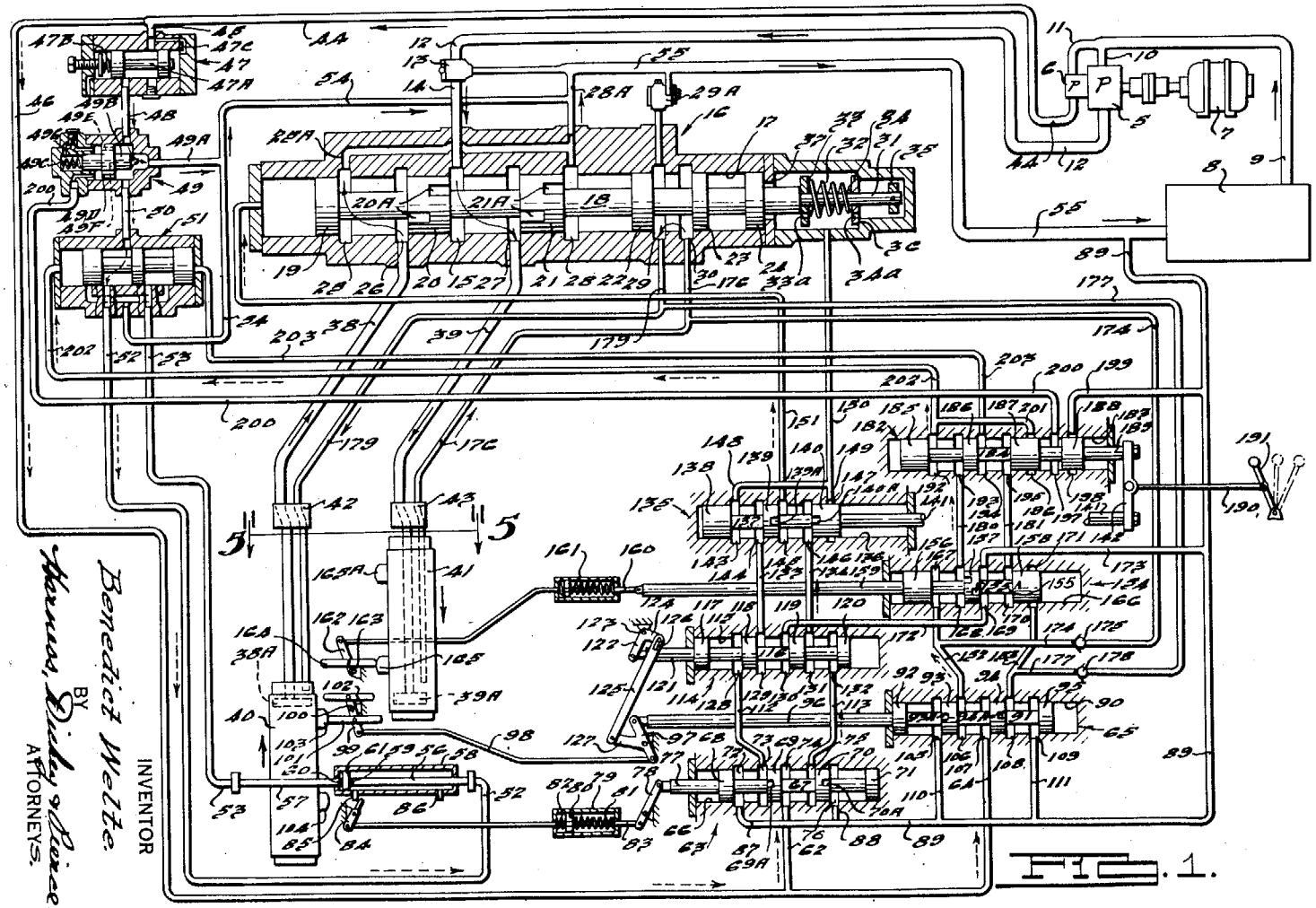
Figure 1 is a diagrammatic view of the improved hydraulic circuit, and various control valves therefor.

The port 145 of valve 135 is connected to a line 151 which leads to the opposite end of the control valve 16 for carrying fluid into the casing to shift the valve spool 18 to the right therein, as shown in the position illustrated in Fig. 1 of the drawings. The lines 150 and 151; lines 133 and 134; and lines 112 and 113 are hereinafter referred to collectively as the primary pilot circuit.

The ports 106 and 108 of control valve 65 are connected to lines 152 and 153, respectively, which lead to a control valve generally designated 154 in which is axially slidable a valve spool 155. The spool 155 comprises bore fitting, axially spaced, cylindrical lands 156, 157 and 158 joined by reduced neck portions in the usual manner. One end of the spool is provided with an integrally formed, axially extending, rod 159, to the outer end of which is pivoted one end of a link 160 which passes through a spring centering device 161 of the same general construction as the centering device 79. The other end of the link 160 is pivoted to one end of a lever 162 fulcrumed at 163. The lever 162 carries a plunger 164, one end of which is adapted to be engaged and actuated by a lug 165 carried by the broaching cylinder 41, and the other end of which is adapted to be engaged by a lug 104 of the cylinder 40, for rocking the lever 162 and thereby shifting the spool 155 axially in its bore.

The cylindrical bore 166 of the valve 154 is provided with axially spaced, encircling port grooves 167, 168, 169, 170, and 171, which are positioned so as to be controlled by the lands of the spool 155.

The port 169 of control valve 154 is connected to the port 130 of control valve 114 by a line 172, and the port 169 is also connected to the return fluid line 89 by a line 173.

The line 152 has a branch pre-fill line 174, which passes through a check valve 175, and thence to a line 176, one end of which communicates with the port 30 of valve 16, and the other end of which passes through manifold 43, and thence to the interior of broaching cylinder 41 above the piston 39A for moving the cylinder upwardly.

The line 153 has a branch pre-fill line 177 connected thereto which passes through a check valve 178, and thence to a line 179, one end of which communicates with the port 29 of valve 16, and the other end of which passes through the manifold 42 and into the broaching cylinder 40 above the piston 38A, for moving the cylinder upwardly. The lines 174 and 177 are hereinafter referred to as the pre-fill circuit and the lines 176 and 179 are hereinafter referred to as the closed circuit.

Ports 168 and 170 of control valves 154 are provided with lines 180 and 181, respectively, which communicate with a manually operable control valve, generally designated 182. The valve 182 is provided with a cylindrical bore 183 in which a valve spool 184 is axially slidable. The spool 184 comprises bore fitting, cylindrical, axially spaced lands 185, 186, 187, and 188, connected by reduced neck portions which permit flow of fluid axially within the limits of any two of the lands. One end of the spool 184 is provided with an axially extending rod 189 which is rigidly connected to the cross head 142 so that the spools 184 and 137 may be moved in unison manually by a link 190 which is connected to a hand lever 191.

The interior wall of the bore 183 is provided with axially spaced, encircling, port grooves 192, 193, 194, 195, 196, 197, and 198 which are positioned so as to be controlled by the lands of the spool 184. Port 198 has a line 199 connected thereto which communicates with the fluid return line 89. Port 197 has a line 200 connected thereto which conducts fluid from the relief valve 49. Ports 196 and 192 are connected by lines 201 and 202 to one of the valve operating ports of the four way valve 51. The port 194 is connected by a line 203 to the other valve operating port of the four way valve 51. The lines 201, 202, 203, 180, 181, 152 and 153 are hereinafter referred to as the secondary pilot circuit for operating the secondary control valve of the secondary circuit.

In operation, this hydraulic circuit, as heretofore stated, provides control for a machine having three hydraulic cylinders which are required to move through a continuous cycle. The cylinders 40 and 41 are preferably positioned with their axes vertically and in horizontally spaced parallel relation, and move simultaneously in opposite directions. The stroke of the cylinders is adjustable on the lower end, while on the upstroke the cylinders stop against the piston or any other positive stop which may be provided therefor. After reaching their stopping points, the cylinder 58 is required to make one move, thereby operating a transverse slide or similar mechanism for moving work into position to be operated on by tools which are actuated by the cylinders 40 and 41.

After the movement of the cylinder 58 is completed, the cylinders 40 and 41 again begin to move in opposite directions as before, and upon reaching their new end position, the cylinder 58 moves in the opposite direction, thus bringing the different moving members back into their original position. From this point on, the movements repeat themselves, as described above, thereby forming a continuous cycle.

This cycle of movements can be used to operate vertical double ram broaching machines where the cylinders 40 and 41 operate slides which in turn carry broaching tools, and the cylinder 58 operates a work table with two workholding fixtures in such a way as to put one fixture in cutting position and retracting the other fixtures away from the upgoing broach slide, allowing it to be unloaded and reloaded with a new work piece.

In Figure 1 is illustrated the position of the parts at the instant of the starting of the machine. The direction of flow through the lines and valves of the circuit is indicated by the solid line arrows, while dotted line arrows are used to indicate the direction in which pressure is exerted in the absence of flow. In this position of the parts, the hydraulic pump 6 is supplied with fluid from the reservoir 8 through the intake lines 9 and 11, and delivers fluid under pressure through the lines 44, 46, and 62 to the port 74 of the valve 63, and through the line 64 to port 107 of the control valve 65. From port 107 the fluid passes axially along the spool 91 into port 106, and thence into lines 152 and into port 167 of valve 154. From port 167 the fluid passes axially along the spool 155 to port 168, thence into line 180 to port 193 of valve 182. From port 193 the fluid passes axially along spool 184 to port 192, and thence into line 202 which leads to one of the operating ports of the four way valve 51. Pressure in the line 202 holds the spool of the valve 51 to the right, as viewed in Figure 1 in such a way as to connect the intake line 50 of the valve with pressure line 52, and at the same time connect line 53 with fluid return line 54 which empties through the return line 55 into the reservoir 8. Fluid is supplied to the four way valve 51 through the pressure line 44, branch 45, by-pass valve 47, line 48, relief valve 49, and thence to the line 50 which communicates with the four-way valve 51.

With the spool of the four way valve 51 thus positioned, fluid under pressure from the pump 6 has just been delivered through line 52 to the hollow piston rod 56, out through the aperture 59 therein, thereby moving the cylinder 58 to the position shown in Fig. 1 of the drawings. This causes the work holding fixture, which is connected to the cylinder, to be held in proper position in relationship to the broaching ram cylinder 41.

At the same time, fluid from the line 152 passes into the branch pre-fill line 174, through check valve 175, and thence to the line 176, one end of which communicates with the interior of the cylinder 41 above the piston 39A therein, thus insuring the filling of the line with fluid and raising of the cylinder 41 to its topmost beginning position. The purpose of this arrangement lies mainly in the period preceding the one shown in Figure 1 of the drawings, and also preceding the movement of valve 51 and cylinder 58 to the positions of Fig. 1. At that time, the spool 18 of valve 16 is held in its mid-position by the spring 32, and when in that position the land 23 of spool 18 will be positioned between the ports 29, and 30, which blocks the port 30 from any other communication. Thus, fluid entering the line 176 under pressure, moves the cylinder 41 in its top position if not already in that position and supplies any loss of oil past the rings of piston 39A, and the packing glands in the top end of the cylinder during its movement.

As soon as cylinder 58 reaches the position of Fig. 1, fluid from the port 74 of valve 63 was conducted axially of the spool 67 to the port 75, and thence through line 113 to port 132 of valve 114. From port 132 the fluid passed axially along the spool 116 to port 131 and thence through line 134 to port 146 of valve 135. From port 146 the fluid was conducted axially along the spool 137 to port 145, and thence through line 151 to the left end of the valve 16, thereby moving the spool 18 to the right, as illustrated in the position shown in the drawings.

It will be noted that after the shift of valve 18 and the other parts to the position shown in Fig. 1, no further flow of fluid can occur in lines 46 and 52. This causes pressure to build up in these lines and consequently in lines 44, 45 and 48 to such an extent that the pressure relief valve 49 opens to the position shown in Fig. 1, thus venting the pump 6 and pressure line 44 to the tank 8 through lines 49A, 54 and 55. This opening movement of pressure relief valve 49 was the last movement of the parts prior to their condition illustrated in Fig. 1. Valve 49 serves to limit the pressure which is built up in the lines in communication with the valve, but when open the pressure is sufficient to hold valve 18 in the position of Fig. 1 against the force of spring 32 so long as line 200 is closed by the spool of valve 182.

When the spool 18 is moved to the position shown in Figure 1 of the drawings, fluid under pressure from the main hydraulic pump 5 passes through line 12, pressure relief valve 13, line 14, port 15, axially into port 27, and thence into line 39, which leads to the cylinder 41.

Fluid under pressure from the line 39 will pass through the stationary piston 39A and into the cylinder 41 at the lower side of the piston, thus moving the cylinder 41 downwardly on its broaching or work performing stroke. As soon as the cylinder 41 moves downwardly, the lug 165 thereon clears the plunger 164, thus permitting the spring centering device 161, through the rod 159, to move the spool 155 to its mid-position, at which time the land 158 will cover the port 171 and the land 157 will be centered over port 169 but permit passage of fluid thereby due to the notches 155A formed therein, and the land 156 to cover the port 167 and shut off communication therethrough.

Cylinder 41, in moving downwardly, will force fluid contained above the piston 39A out through the line 176 into port 30, thence to port 29, and from there into line 178. From line 178 the fluid will enter the cylinder 40 above the piston 38A therein, thus raising the cylinder upwardly as the cylinder 41 moves downwardly. As soon as the cylinder 40 moves upwardly, the lug 103 will disengage from plunger 101 and contact plunger 102, moving it to the right from the position shown in the drawings, and thereby through link 98, lever 97, and rod 96, move the spool 91 to its mid-position. When spool 91 is moved to mid-position, communication between ports 107 and 106 is interrupted, which thereby shuts off further prefill action through the check valve 175 to the line 176. Spool 116 of valve 114 is not affected by movement of the link 98, lever 97, arm 127, and link 125, due to the slot and pin connection 126, thus leaving the valve in the position shown in the drawings.

Figure 2:
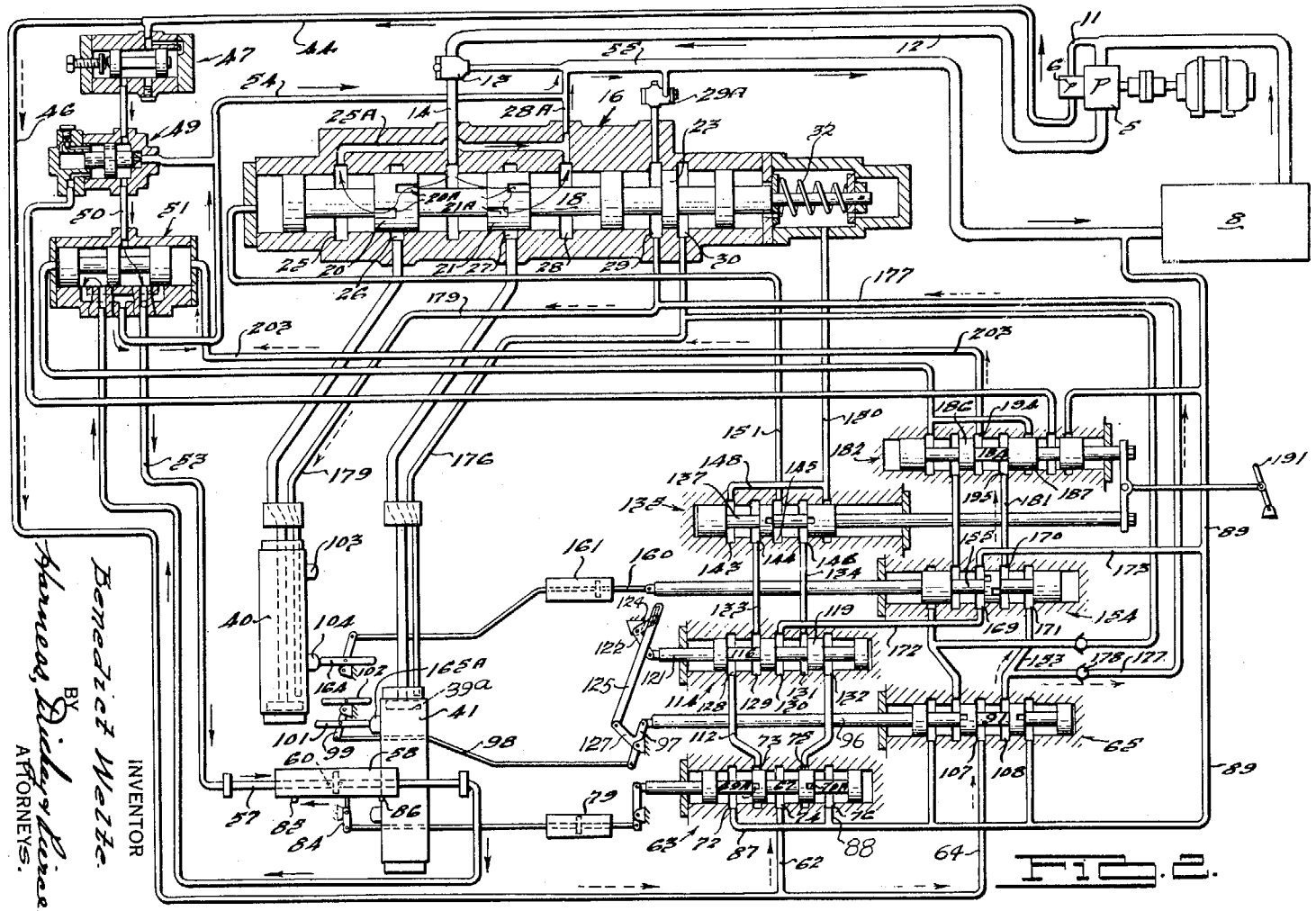
Figures 2, 3 and 4 show the improved hydraulic circuit of Figure 1, but with the valves in each case in the positions they assume during different portions of the cycle of operation of the machine.

Downward movement of the cylinder 41 continues until the lug 165A engages the plunger 101, at which time the lever 99, and link 98, is moved to the left as shown in Figure 2 of the drawings. When moved to this position, the lever 97, through rod 96, moves the spool 91 to its extreme right hand position, and through arm 127 and link 125, bell crank 122, 124, and rod 121, the valve 116 is moved to its extreme right hand position.

Movement of the spool 116 to its extreme right hand position causes the port 132, which is connected to pressure, to be cut off from port 131 by the land 119 of spool 116, and at the same time connects the port 131 with the port 130, which, through line 172, communicates with port 169 of valve 154. From port 169 the fluid is vented through line 173 to the fluid return line 89, thence to the reservoir 8. This venting of the fluid enables the spring 32 of the spring center means of valve 16 to move the spool 18 to its mid-position shown in Fig. 2, the fluid from the left end of the cylinder being vented through line 151, port 145, port 146, line 134, port 131, port 130, line 172, and thence through lines 173 and 89 to the reservoir 8.

In order to let the spool 18 move freely, it is also necessary to connect line 150 through branch 148, port 143, port 144, line 133, port 129, port 128, line 112, port 73, port 72, line 87 to line 89, and thence to the reservoir 8.

The movement of the spool 18 to its mid-position serves a two-fold purpose. First, the land 23 is moved in between the ports 29 and 30, thereby shutting off communication between the two ports, which arrests, through hydraulic lock the movement of the cylinder 41. Second, the lands 20 and 21 are moved over ports 26 and 27, respectively. Fluid delivered now by the pump 5 is by-passed through the slots 20A and 21A, respectively, to the ports 25 and 28, thence through the return lines 25A, 28A, and 55 to the reservoir 8.

The work performing hydraulic cylinder 40 should theoretically reach its extreme top position when the lug 165A contacts plunger 101, but in practice two conditions have to be considered. The first is when the cylinder 40 reaches its top position ahead of time. In this case the cylinder 41 continues to move downwardly, and the oil displaced from the cylinder above the piston 39A is forced out through the line 176 into the port 30, but can no longer pass from the port 29 into the line 178 due to the fact that the cylinder 40 has reached its top limit of movement. In such a case the fluid is forced out through pressure relief valve 29A into the return flow line 55, and thence returned to the reservoir 8.

The second case is where the cylinder 40 lags behind in its movement and does not reach the upper limit of its stroke by the time the cylinder 41 is forced down to the lower set limit of its stroke. As has been explained before, when cylinder 41 reaches the bottom of its stroke, the spool 91 has been moved into the position shown in Figure 2 of the drawings. Pressure fluid from the port 107 now enters the port 108, and thence into line 153. Port 171 is blocked by land 158 of spool 155, by reason of the spring centering device 161 which holds the spool 155 in mid-position, the land 158 covering the port 171 for the reason that the plunger 164 has not as yet been contacted by the lug 104 of the cylinder 40. Therefore, the only way for this fluid to go is through the line 177, check valve 178, and thence to the line 179, thereby forcing the cylinder 40 on upwardly to its topmost position, at which time the lug 104 will cam the plunger 164 to the right, thereby forcing the spool 155 to its right hand position, shown in Figure 2.

When the spool 155 is moved to its right hand position, the fluid under pressure in the port 171 will now flow axially of the spool to port 170, and thence into line 181 which communicates with the port 195 of valve 182. From port 195 the fluid flows axially of the spool to port 194, and thence into line 203 which leads to one of the valve spool operating ports of the four-way valve 51. The fluid under pressure coming in from the line 203 will now shift the spool in the four-way valve 51 so that fluid entering through the line 50 into the valve will pass out through the line 53 of the secondary circuit, thence to the hollow piston rod 57 and out through the aperture 60 therein into the left hand end of the work moving hydraulic cylinder 58, thereby moving the cylinder 58 to the position opposite to that shown in Fig. 1 with respect to its stationary piston 61. Figure 2 of the drawings illustrates the position of the valves and parts during movement of the cylinder 58 from its right hand to its left hand position. The cylinder 58 may be connected to work holding fixtures in such a manner as to move one fixture away from the hydraulic cylinder 41 which has just completed its down stroke and move another work holding fixture into position to be operated on by the hydraulic cylinder 40 when it is next moved downwardly.

It is to be noted that movement of the work shifting cylinder 58 can take place only after both of the work performing cylinders 40 and 41 have reached their proper positions by reason of the shifting of the spools 91 and 155, which shifting is done only when the cylinders 40 and 41 have reached their limit positions, at which times the lug 104 or the lug 165 shifts the plunger 164, and either the lug 103 or lug 165A shifts the plunger 101. It will thus be seen that it requires the shifting of both of the spools 91 and 155 before reversal of pressure takes place in the pilot lines 202, 203, which control the four way valve 51, which in turn controls the secondary pressure circuit comprising the lines 52 and 53. Such an arrangement is very important to the satisfactory operation of a dual ram broaching machine.

As the work moving cylinder 58 moves to the left, as just described, the lug 85 disengages from the upper end of the lever 84 and permits the spring centering device 79 to shift the spool 67 in a left hand direction to its mid-position. The reason for this will be described later. Upon completion of the movement of the cylinder 58, the lug 86 will contact the upper end of lever 84 and move it to the position shown in Figure 3 of the drawings, thereby shifting the spool 67 to its extreme left hand position. When in that position, fluid under pressure from the line 62 and port 74 will enter the port 73, line 112, port 128, and, due to the fact that the spool 116 has been shifted to the right, fluid will flow from port 128 into port 129, thence into line 133 to port 144 of valve 135. From port 144 the fluid will pass axially along the spool 137 to port 143 into line 148, thence into line 150 and into the right hand end of the main control valve 16, thereby shifting the spool 18 to the left, i. e., to the position shown in Figure 3 of the drawings.

When the spool 18 is shifted to the left, fluid from the left end of the valve is vented through line 151, ports 145 and 146, line 134, to port 131. The spool 116 having been shifted to the right so that the land 119 is to the right of port 131, the fluid will flow into port 130, thence to line 172, to port 169 of valve 154. From port 169 it will flow into line 173 to the fluid return line 89, thence through line 55 into the reservoir 8. After spool 18 has been shifted to the left as shown in Fig. 3 valve 49 will open as previously explained to bypass pump 6 as clearly shown in Fig. 3.

Figure 3:
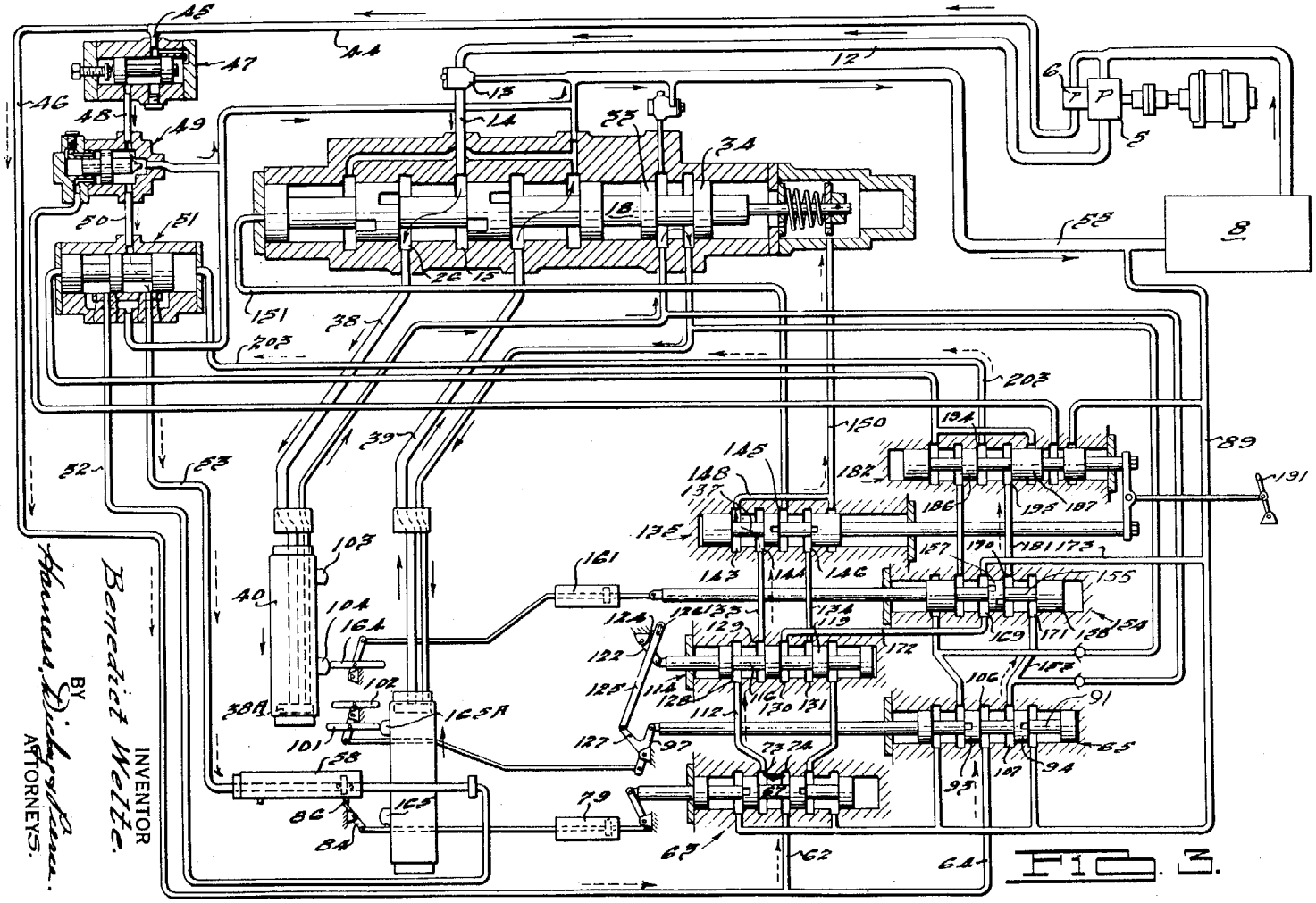

The spool 18 having moved to its new position of Figure 3 of the drawings, fluid under pressure is delivered by the pump 5, through line 12, pressure relief valve 13, and line 14 into port 15. From port 15 fluid will flow axially along the spool 18 into port 26, thence into line 38 of the primary circuit which includes the lines 38 and 39. The line 38 leads to the work performing cylinder 40 which is in its upper position and passes into said cylinder below the piston 38A therein, thereby forcing the cylinder downwardly on its work performing stroke. From here on, the operation of the parts is the same as that heretofore described, with the exception that the cylinders and linkage controls are just the opposite to that hereinabove described. It will thus be seen that there is a positive interlock between the movements of the three hydraulic cylinders 40, 41, and 58. If either of the cylinders 40 and 41 are not in their extreme position, then the spools 91 and 155 of the valves 65 and 154 will be in their mid-position, whereby the flow of fluid under pressure to the pilot circuit 202, 203, of the four way valve 51 is blocked and no movement of its spool takes place; therefore, no change in the position of work moving cylinder 58 is possible.

Furthermore, when the cylinder 58 is away from either one of its end positions, the spring centering device 79 will hold the spool 67 in its mid-position, thereby blocking fluid under pressure in the port 74 from reaching either the port 73 or port 75, which two ports finally lead to the lines 150 and 151, which communicate with opposite ends of the main control valve 16 for shifting the spool therein. The lands 69 and 70, however, have notches 69A and 70A, respectively, which connect the ports 73 and 75 with the lines 87 and 88 through the respectively adjacent ports 72 and 76. This will equalize any difference of pressure which might exist in the lines 150 and 151 and thereby enable the spring centering device of the valve 16 to centralize the spool 18, which thereupon blocks movement of the cylinders 40 and 41 by reason of the land 23 of spool 18 moving in between the ports 29 and 30, while at the same time permitting fluid from the pump 5, lines 12 and 14, to be vented by by-passing through the notches 20A and 21A, and thence to the return lines 25A and 28A to the return line 55.

During long periods of idleness, it may be that the closed circuit comprising the lines 176 and 179 have lost large amounts of fluid. For instance, consider the situation when the machine is set at full stroke. The various parts have just reached the position shown in Figure 1 of the drawings and the motor is shut off so that the pump comes to rest before any movement of the spool in the four way valve 51 has taken place. It is further assumed that the machine is now allowed to rest for a length of time during which the cylinder 41 sinks down a considerable distance from its top position, but not so far as to make the lug 165A contact the plunger 101.

Now it is assumed that the motor is turned on again and fluid from the pump 6 flows under pressure through the lines 44, 46, and 64 to the port 107, thence to port 106, line 152, line 174, check valve 175, to line 176. From line 176 the fluid will flow into the cylinder 41 above the piston 39A, thereby raising the cylinder upwardly to its top position. This is made possible by reason of the spool 18 being held in its mid-position by the spring 32 of the spring centering device, and the land 23 shutting off communication between the ports 29 and 30. As the cylinder 41 is thus raised to its top position, fluid is forced out through the line 39 from the under side of the piston 39A and flows through the line 39 into port 27 through the slots 21A in land 21 to the port 28, and thence through line 28A to return fluid line 55 which leads to the reservoir 8.

During all this time no fluid is admitted to four way valve 51 until the prefill action brings the cylinder 41 to its top position where the lug 165 cams the plunger 164 to the left against the spring centering device 161, and thereby shifts the spool 155 to the position shown in Figure 1 of the drawings. When shifted to this position, fluid from port 167 will pass axially to port 168, and thence to line 180 which leads to port 193. From 193 the fluid will flow axially of the spool 184 to port 192, and thence to line 202 of the pilot circuit which operates the spool of the four-way valve 51.

Shifting of the spool in valve 51 permits fluid under pressure from the pump 6 through lines 44, 45, by-pass valve 47, line 48, pressure relief valve 49 and line 50 to enter the line 52 of the secondary circuit, and thence into the right hand end of the cylinder 58 which moves the cylinder to the right, as shown in the drawings.

Consider the machine when the cylinders 40 and 41 are in the position shown in Figure 1 of the drawings, and the work moving cylinder 58 is in its extreme left hand position, and the spool in the valve 51 has been shifted preparatory to the cylinder 58 moving to the right. It is assumed now that the motor 7 is shut off and the machine not used for a considerable length of time. The cylinder 41 under the influence of gravity may sink down from its top position. This creates a hazard, as tools mounted on the slide driven by the cylinder 41 might interfere with any fixtures which would be carried into position in relation to the cylinder 41, if it would move as the cycle demanded. Now, upon restarting the motor 7, fluid delivered by the pump 6 will flow first through the lines 44, 46, and 64, ports 107 and 106, line 152, line 174, check valve 175 to line 176, and thereby replenish the fluid on top of piston 39A of cylinder 41, and thereby lifting the cylinder 41 back to its top position.

The cylinder 58 will not move during this prefill action because the by-pass valve 47 is set at a sufficiently high pressure so as to not allow any fluid to flow through it until after the cylinder 41 has reached its top position, at which time further flow through the line 46 is resisted, and the valve 47 is forced open, thereby permitting fluid to flow through the lines and thus resume the normal cycle of operation.

It is to be further noted that fluid under pressure in the line 46 passes through line 62 into port 74, port 73, line 112, to port 128 of control valve 114, at which point it is blocked due to the land 118 being in position between the ports 128 and 129. Also, the fluid passing through the line 64 to port 107, port 106, line 152, to port 167, is also blocked by reason of the fact that the spring centering device 161 has moved the spool 155 to the right to its mid-position immediately upon the lug 165 disengaging from contact with the plunger 164.

Considering the machine in a position where the cylinders 40 and 41 are in the position as shown in Figure 1 of the drawings; the cylinder 58 has started out on its trip to the right and the motor 7 has been shut off. It is assumed that after the cylinder 41 has left its top position, the motor 7 is turned on again. As heretofore explained, the by-pass valve 47 will prevent any flow of fluid to the four-way valve 51, and cylinder 58 until the prefill action is complete. The cylinder 58 being away from its end position, the spool 67 will be in mid-position, thereby preventing any flow of fluid from the port 74 to either of the ports 73 or 75. Fluid is thus blocked from the line 62 and forced to the line 64 and thence to the prefill circuit.

Consider now the same case of the top cylinder 41 dropping during idleness, but with the machine set at less than full stroke. The difference in this case is that the cylinder 40 is also affected by gravity, and will lose position. In such an instance, no interference between tools and fixtures and work pieces will take place because gravity will carry the cylinder 40 down away from the tools. Therefore, it is not necessary to make provision to correct position of cylinder 40 before resuming the normal cycle of operation. Advantage has been taken of this fact. The prefill action through check valves 175 and 178 is controlled through the valve 65. Prefill is started at either extreme position of the spool 91 and shut off in its center position. Now the ascending cylinder 40 will shut off this prefill by centering the spool 91 through the plunger 102, link 98, lever 97, and rod 96. The dropping of cylinder 40, however, will not affect the position of the spool 91 because the centering action is caused in this case not by an automatic centering device, but by mechanical linkage which is only effective in one direction.

Considering now the case where the machine being set on part stroke of cylinders 40 and 41 is allowed to stand idle, that cylinder 41 sinks to a position where the lug 165A is below the plunger 101. In this case the circuit will not automatically correct the position of the cylinders, and a manual prefill has to be used. As shown most clearly in Fig. 6 of the drawings, the lever 99 is pivoted on an axially slidable shaft 100, and this shaft can be moved axially to the right, as viewed in Fig. 6, against the action of spring 99A whereby it is disengaged from the plungers 101 and 102, but maintains connection with the link 98. Now, by turning this shaft 100 manually, the spool 91 may be shifted to either extreme position, thereby admitting fluid under pressure from port 107 to either port 106 or 108, and thereby raising either the cylinder 40 or 41 upwardly at the will of the operator until one of the lugs 103 or 165A gets above the plunger 101, from which point on, the circuit takes care of any further movement.

The above described disengagement of the lever 99 from the plungers 101 and 102 is provided to make the manual prefill independent of the position of the plungers 101 and 102, inasmuch as they may become locked by being contacted simultaneously by the lugs 103 and 165A. No interference can be created by this manual prefill action. The work moving cylinder 58 cannot move due to the spring centering device 161 and by-pass valve 47. Furthermore, the cylinder which was originally in the top position will always be able to return to its top position without interference because the position of cylinder 58 must have been such that the cylinder 41 could sink down without interfering with fixture controlled by the cylinder 58.

With respect to the stopping of all moving members in case of emergency, or the like, such functioning is controlled by the manually operable valves 135 and 182, the spools 137 and 184, respectively, of which are rigidly connected to a cross head 142 which in turn is connected through the link 190 to a manual control handle 191.

In order to stop the operation of all parts of the machine, the lever 191 is moved to the center position, shown in dotted outline. This causes the spools 137 and 184 to move to their center position. The land 139 of spool 137 will now stand midway over the port 145, and the land 140 will be midway over the port 147. Now the pilot line 151 of the main control valve 16 will communicate through port 145, slots 139A, slots 140A, port 147 and line 149 with pilot line 150 at the other side of the spool 18, thereby balancing hydraulically regardless of pressure conditions in the ports 144 and 146, and allowing the spring 32 to move spool 18 to its mid-position, which, as heretofore pointed out, hydraulically locks cylinders 40 and 41 by blocking communication between the ports 29 and 30, with the land 23, while at the same time allowing fluid delivered by the main pump 5 to be by-passed through the slots 20A and 21A. This stops the movements of the cylinders 40 and 41 under any conditions, and vents the pump 5.

The mid-position of the spool 184 provides communication between ports 197 and 198, and allows fluid to flow from pressure relief valve 49 through the line 200 to port 197 axially along the spool to the port 198, and thence through line 199 to the fluid return line 89, line 55 to reservoir 8. Due to the particular construction of the valve 49, which construction constitutes no part of the present invention, unrestricted flow through the line 200 will cause the relief valve 49 to allow fluid to be by-passed through the line 49A to line 54, thence to line 55 and to the reservoir 8 at a pressure much lower than necessary to move the cylinder 58 and thereby stop its motion immediately.

After the machine has been stopped by moving the manual control handle 191 to its center position, either by reason of emergency, or otherwise, it may then be necessary to reverse the movements of all of the parts and return them to the positions from which they started, and from there again start out in the normal cycle of operation.

Assume that the machine is in the position shown on the drawings and that the cylinder 41 has started down on its work performing or cutting stroke, it being assumed that this cylinder is carrying a broaching tool and on its down stroke will perform a broaching operation on a work piece clamped on a fixture which is held in position in certain relationship to the broaches or other tools carried by the cylinders 40 and 41. It is further assumed that for some unforeseen reason the resistance offered to the broaching tools by the work piece is greater than the power developed in the cylinder 41. This causes the machine to "stall."

Figure 4:
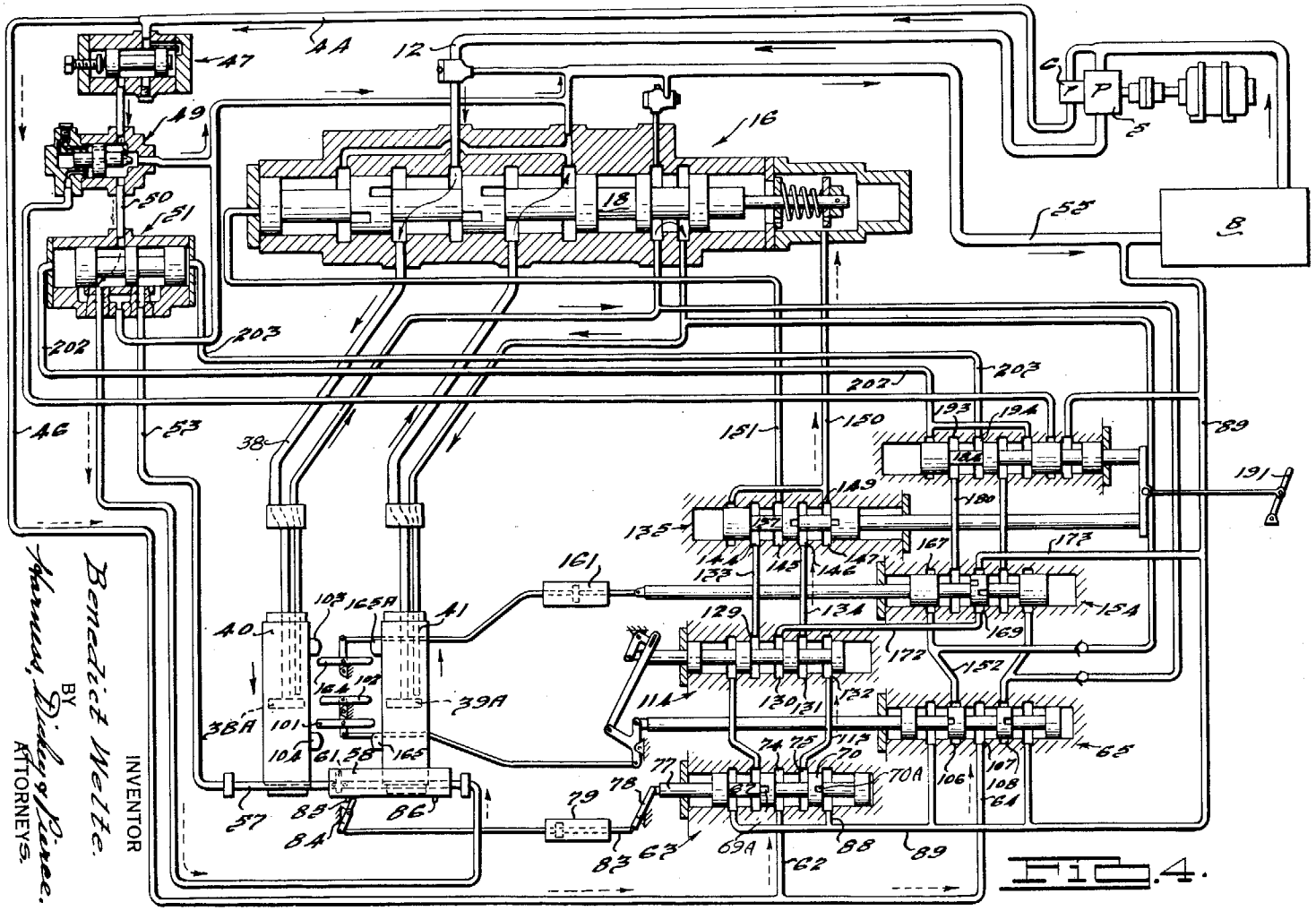

In order to correct this condition with a minimum amount of damage to the broaching tools and the other component parts, it is best to pull the broaches up out of the work piece without releasing the work piece from its clamped position and then move the work holding fixture out of the cutting position into loading position in order to enable the operator to correct the faulty condition. This is accomplished automatically by moving the hand lever 191 into the extreme right position. Figure 4 of the drawings shows the position of the parts when the lever 191 is shifted to its reversing position at a time when the cylinder 41 is moving down. The valves 63 and 114 have not changed from the position of Figure 1 but the spool 137 in valve 135 has been shifted to its extreme right hand position. This causes fluid under pressure to flow from lines 46 and 62 into port 74, thence to port 75, line 113 to port 132. From the port 132 the fluid will flow axially to port 131, thence to line 134 which leads to port 146. From port 146 to the port 147, thence through lines 149 and 150 to the right hand end of the main control valve 16, thereby shifting the spool 18 to the left, the fluid being vented from the left end of the valve 16 through line 151 to port 145, port 144, line 133, port 129, port 130, line 172, port 169, line 173, to fluid return line 89, and thence to reservoir 8.

This positioning of the valve causes fluid from the pump 5 to pass through the main circuit line 38 to the under side of the piston 38A, thereby reversing the motion of the cylinder 40, and moving it down to the position from which it started. As heretofore described, this will cause the cylinder 41 to move upwardly towards its top position, from whence it started. During this motion of the cylinders 40 and 41, the valves 65 and 154 are in their mid-position, and fluid from the lines 46 and 64 is blocked from leaving the four way valve 65 through the ports 106 and 108. This makes ineffective at this time any movement of the spool 184, as caused by hand lever 191. The position of the cylinder 58 will be maintained until the cylinders 40 and 41 have returned to their starting position, as shown in Fig. 1 of the drawings, thereby shifting the spools in valves 65 and 154 out of their mid-positions into the position shown in Fig. 1 and allowing fluid to flow from port 107 to port 106, line 152, port 167, port 168, line 180, to port 193. Due to the reverse position of the spool 184, fluid will pass from port 193 to port 194, line 203, thence to the four way valve 51, thereby shifting the spool in the valve to the opposite or left position and causing fluid from the line 50 to flow through line 53, hollow piston rod 57, to the left hand side of the piston 61, thereby causing the cylinder 58 to move to the left and thereby moving the fixture in question out of the cutting position and into the loading position.

The cylinder 58, upon leaving the position shown in Fig. 4, permits the spring centering device 79 to move the spool 67 in valve 63 to its mid-position. Movement of the valve to mid-position causes lines 150 and 151 leading to valve 16 to be connected to the reservoir 8 through line 151, port 145, port 144, line 133, port 129, port 130, line 172, port 169, line 173, line 89, and line 55. The line 150 is vented through port 147, port 146, line 134, port 131, port 132, line 113, port 75, slots 70A, lines 88, 89, and 55 to reservoir 8. The spool 18 will move to its mid-position, thereby locking cylinders 40 and 41 and venting the pump 5 back to the reservoir. This helps to keep the hydraulic system at low temperature.

Upon reaching its left hand position, the cylinder 58, by engagement of the lug 86 with lever 84, shifts the rod 83, lever 78, and rod 77 to move the spool 67 into its left hand position. This movement of the spool does not affect the venting of the main control valve through the line 151, as described above, because venting from that line does not pass through the valve 63. Also, the line 150 continues to be vented through the valve 63, the land 70 now being moved entirely clear of the port 75. Therefore, no further movement will take place and the cylinders 40, 41 and 58 will come to rest and give the operator an opportunity to make correction of whatever was the cause of the stalling of the machine.

After the fault has been corrected, and in order to lead the machine back into its normal operating cycle, the hand lever 191 is moved to the left to the position shown in full lines in Fig. 1, and which position may be marked "Go." As heretofore stated, both ends of the main control valve 16, through the lines 150 and 151, are connected to the reservoir 8, and shifting of the spool 137 does not have any immediate effect.

The four way valve 51, however, is under control pressure of the line 203, and upon shifting the spool 184 with the handle 191, this control fluid is switched to the opposite line 202, thereby shifting the spool in the valve 51 and reversing the flow of fluid from the pump 6 to cause the work moving cylinder 58 to move to the right. This is the position shown in Fig. 1, and the hydraulic action will take place, as described before, as the machine is now again on its regular cycle.

Another case has to be provided for, and that is where the operator loads a work piece in the wrong manner which would cause damage if the machine were allowed to proceed with its cycle. If the operator wishes to return the work moving cylinder 58 to its starting position after it has left the starting position but before movement of the cylinders 40 and 41 has begun, he again puts the hand lever 191 in the reverse position. The hydraulic condition thereby created is identical with the one heretofore described. The cylinder 58 will reverse and go back where it came from, and no further movement will take place, the cylinders 40 and 41 being locked against movement during this time. Upon making correction on the loading of the work piece, the hand lever 191 may be moved into the "go" position, and the movements take place in the same manner as heretofore described for the regular and normal cycle of operation of the machine.

The construction and arrangement herein shown and described permits an operator by manipulating the handle 191 to move any one of the three hydraulic cylinders in extremely small increments, generally referred to as an "inching" process. That is to say, the moving parts can be stopped in very short distances and moved very short distances, which is of considerable advantage in setting up a machine incorporating this hydraulic circuit for locating the parts in exact position as is so often wanted.

In order to more readily comprehend the meaning of the claims, the following is a summary of the main features. The pump 5 is referred to as a primary pump; the primary circuit comprises the lines 38 and 39; the primary valve is the pressure operated control valve generally designated 16; and the primary pilot circuit comprises the lines 150, 151, 133, 134, 112 and 113. The pump 6 is referred to as the secondary pump; the secondary circuit comprises the lines 52 and 53; the secondary valve is the four way fluid pressure operated valve 51; and the secondary pilot circuit comprises the lines 201, 202, 203, 180, 181, 152 and 153. The prefill circuit comprises the lines 174 and 177, and the closed circuit comprises the lines 176 and 179.

Formal changes may be made in the specific embodiment of the invention disclosed without departing from the spirit and substance of the broad invention, the scope of which is commensurate with the appended claims.

What is claimed is:

1. In a hydraulic circuit, a primary circuit, a pair of work performing hydraulic cylinders having one end of each connected in said primary circuit, a valve for controlling said primary circuit so as to move said cylinders simultaneously in opposite directions, a secondary circuit, a work moving hydraulic cylinder connected in said secondary circuit, a single closed circuit interconnecting the opposite ends of said work performing hydraulic cylinders during movement of either cylinder on its work performing stroke, means for blocking said closed circuit to prevent movement of said work performing cylinders during movement of said work moving cylinder, and means for supplying fluid under pressure to all of said circuits.

2. In a hydraulic circuit having a continuous cycle of operation, a primary circuit, a pair of work performing hydraulic cylinders connected in said primary circuit, a closed circuit connecting said cylinders for moving either one of said cylinders when the other is moved by fluid pressure from said primary circuit, means for prefilling said closed circuit, interlocking means for preventing operation of said cylinders on continuous cycle until said closed circuit has been prefilled, and means for supplying fluid under pressure to all of said circuits.

3. In a hydraulic circuit, a primary pressure circuit, a pair of work performing hydraulic cylinders connected in said primary circuit, a primary valve for controlling the flow of fluid to said cylinders, a primary pilot circuit connected to said primary valve for actuating the same, a secondary pressure circuit, a work moving reciprocating hydraulic cylinder connected in said secondary circuit, a secondary valve for controlling the flow of fluid to said work moving cylinder, a secondary pilot circuit connected to said secondary control valve for actuating the same, a control valve actuated by said work moving cylinder for controlling the flow of fluid to said primary pilot circuit, a control valve actuated by said work performing cylinders for controlling the flow of fluid to said secondary pilot circuit, and means for supplying fluid under pressure to the circuits whereby said work performing cylinders are moved simultaneously in opposite directions each time after said work moving cylinder is reciprocated to one of its limits.

4. In a hydraulic circuit, a primary circuit, a pair of work performing hydraulic cylinders in said primary circuit, a primary valve for said primary circuit, a primary pilot circuit for moving said primary valve, a secondary circuit, a work moving hydraulic cylinder in said secondary circuit, a secondary valve for controlling said secondary circuit, a secondary pilot circuit for operating said secondary circuit valve, a valve actuated by said work moving cylinder for controlling said primary pilot circuit, a valve actuated by said work performing cylinders for controlling said secondary pilot circuit, and means for supplying fluid under pressure to said circuits.

5. In a hydraulic circuit, a primary circuit, a pair of work performing hydraulic cylinders in said primary circuit, a primary valve for said primary circuit, a primary pilot circuit for moving said primary control valve, a secondary circuit, a work moving hydraulic cylinder in said secondary circuit, a secondary valve for controlling said secondary circuit, a secondary pilot circuit for operating said secondary circuit valve, a valve actuated by said work performing cylinders for controlling said secondary pilot circuit, a valve actuated by said work moving cylinder for controlling said primary pilot circuit, means for supplying fluid under pressure to said circuits, and manually operable valves for controlling both of said pilot circuits.

6. In a hydraulic circuit, a primary circuit, a pair of work performing hydraulic cylinders in said primary circuit, a primary valve for said primary circuit, a primary pilot circuit for moving said primary control valve, a secondary circuit, a work moving hydraulic cylinder in said secondary circuit, a secondary valve for controlling said secondary circuit, a secondary pilot circuit for operating said secondary circuit valve, a valve actuated by said work performing cylinders for controlling said secondary pilot circuit, a valve actuated by said work moving cylinder for controlling said primary pilot circuit, a closed circuit connected to said work performing cylinders for moving either one of said work performing cylinders when the other is moved by said primary circuit, and means for supplying fluid under pressure to said circuits.

7. In a hydraulic circuit, a primary circuit, a pair of work performing hydraulic cylinders in said primary circuit, a primary valve for said primary circuit, a primary pilot circuit for moving said primary control valve, a secondary circuit, a work moving hydraulic cylinder in said secondary circuit, a secondary valve for controlling said secondary circuit, a secondary pilot circuit for operating said secondary circuit valve, a valve actuated by said work performing cylinders for controlling said secondary pilot circuit, a valve actuated by said work moving cylinder for controlling said primary pilot circuit, a closed circuit connected to said work performing cylinders for moving either one of said work performing cylinders when the other is moved by said primary circuit, means for supplying fluid under pressure to said circuits, and manually operable valves for controlling both of said pilot circuits.

8. In a hydraulic circuit, a primary circuit, a pair of work performing hydraulic cylinders in said primary circuit, a primary valve for said primary circuit, a primary pilot circuit for moving said primary control valve, a secondary circuit, a work moving hydraulic cylinder in said secondary circuit, a secondary valve for controlling said secondary circuit, a secondary pilot circuit for operating said secondary circuit valve, a valve actuated by said work performing cylinder for controlling said secondary pilot circuit, a valve actuated by said work moving cylinder for controlling said primary pilot circuit, a closed circuit connected to said work performing cylinders for moving either one of said work performing cylinders when the other is moved by said primary circuit, means for prefilling said closed circuit, a valve actuated by said work performing cylinders for controlling such prefill, and means for supplying fluid under pressure to said circuits.

9. In a hydraulic circuit, a primary circuit, a pair of work performing hydraulic cylinders in said primary circuit, a primary valve for said primary circuit, a primary pilot circuit for moving said primary control valve, a secondary circuit, a work moving hydraulic cylinder in said secondary circuit, a secondary valve for controlling said secondary circuit, a secondary pilot circuit for operating said secondary circuit valve, a valve actuated by said work performing cylinders for controlling said secondary pilot circuit, a valve actuated by said work moving cylinder for controlling said primary pilot circuit, a closed circuit connected to said work performing cylinders for moving either one of said work performing cylinders when the other is moved by said primary circuit, means for prefilling said closed circuit, a valve actuated by said work performing cylinders for controlling such prefill, means for supplying fluid under pressure to said circuits, and manually operable valves for controlling both of said pilot circuits.

10. In a hydraulic broaching machine, a pair of broaching cylinders, a normally closed circuit connecting one end of each of said broaching cylinders, means for supplying fluid under pressure alternatively to the opposite ends of said broaching cylinders to effect a simultaneous broaching stroke of one cylinder and a return stroke of the other cylinder followed by a simultaneous return stroke of said one cylinder and a broaching stroke of said other cylinder, means acting automatically between the completion of a broaching stroke of one of the cylinders and the institution of the broaching stroke of the other cylinder to feed a workpiece into position to be broached by said last mentioned cylinder, and means acting throughout the period between the completion of the broaching stroke of one of the cylinders and the institution of the broaching stroke of the other cylinder to apply fluid under pressure to the closed circuit end of the last mentioned cylinder.

11. In a hydraulic broaching machine, a pair of broaching cylinders, a normally closed circuit connecting one end of each of said broaching cylinders, means for supplying fluid under pressure alternatively to the opposite ends of said broaching cylinders to effect a simultaneous broaching stroke of one cylinder and a return stroke of the other cylinder followed by a simultaneous return stroke of said one cylinder and a broaching stroke of said other cylinder, means acting automatically between the completion of a broaching of one of the cylinders and the institution of the broaching stroke of the other cylinder to feed a workpiece into position to be broached by said last mentioned cylinder, means for blocking said normally closed circuit at a point between said cylinders throughout the period between the completion of a broaching stroke of one of the cylinders and the institution of a broaching stroke of the other cylinder, and means for applying fluid under pressure to the closed circuit end of the last mentioned cylinder throughout said period to effect a prefill of said normally closed circuit.

12. In a hydraulic broaching machine, a pair of broaching cylinders, means for alternatively supplying pressure fluid to said broaching cylinders at one end of each for moving the cylinders through their broaching strokes, a closed circuit normally connecting the opposite ends of said broaching cylinders to effect return of one cylinder during the broaching stroke of the other, a work moving cylinder adapted at each extremity of its stroke to present work in position to be broached by one of said broaching cylinders, means operable when said broaching cylinders have completed a stroke for reversing the position of said work moving cylinder, means acting on completion of one stroke of said broaching cylinders to prevent a reverse stroke of the broaching cylinders until the work cylinder has completed its movement, means for blocking said normally closed circuit at a point between said cylinders throughout the period between the completion of the broaching stroke of one cylinder and the institution of the succeeding broaching stroke of the other cylinder, and means for connecting said last mentioned cylinder, to a source of pressure throughout said period to effect a prefill of said closed circuit.

13. In a hydraulic broaching machine, a broaching cylinder adapted to reciprocate through a broaching stroke and a return stroke, a work moving cylinder adapted to shift a workpiece into and out of broaching position, means for supplying fluid under pressure to said work moving cylinder to shift the same from a starting position in which the workpiece is retracted from said broaching position into a position in which the workpiece is in broaching position, means operable automatically upon completion of the movement of the workpiece into broaching position for suppplying fluid under pressure to said broaching cylinder to shift the same from a starting position through the broaching stroke, and manually controlled means operable at any time during the aforesaid movements of said cylinders for automatically returning both of said cylinders to their starting positions in reverse order and direction to the order and direction in which they left said starting positions.

14. In a hydraulic broaching machine, a broaching cylinder adapted to reciprocate through a broaching stroke and a return stroke; a work moving cylinder adapted to move a workpiece into and out of position to be broached; a hydraulic circuit for said cylinders; circuit control means for continuously operating said cylinders through a cycle from a starting position in which the work moving cylinder has shifted the work out of broaching position and the broaching cylinder is in position to begin the broaching stroke to effect the successive steps of advancing the work to broaching position, broaching the work, and returning the work and the broach to starting position, and manually controlled means operable at any time during the work advancing movement and the broaching stroke to cause the cylinders to be returned from the position they then occupy to the starting position in reverse order and direction to the order and direction in which they last left said starting position.

15. In a hydraulic broaching machine, a broaching cylinder adapted to reciprocate through a broaching stroke and a return stroke; a work moving cylinder adapted to move a workpiece into and out of position to be broached; a hydraulic circuit for said cylinders; circuit control means for continuously operating said cylinders through a cycle from a starting position in which the work moving cylinder has shifted the work out of broaching position and the broaching cylinder is in position to begin the broaching stroke to effect the successive steps of advancing the work to broaching position, broaching the work, and returning the work and the broach to starting position, and manually controlled means operable when actuated during the broaching stroke to first reverse the broaching cylinder and return it to starting position and then return the work moving cylinder to starting position.

16. In a hydraulic broaching machine; a broaching cylinder adapted to reciprocate through a broaching stroke and a return stroke; a work moving cylinder adapted to move a workpiece into and out of position to be broached; a hydraulic circuit for said cylinders; circuit control means for continuously operating said cylinders through a cycle from a starting position in which the work moving cylinder has shifted the work out of broaching position and the broaching cylinder is in position to begin the broaching stroke to effect the successive steps of advancing the work to broaching position, broaching the work, and returning the work and the broach to starting position, and manually controlled means operable when actuated during movement of the work moving cylinder in a direction to place the workpiece in broaching position to reverse the direction of motion of the work moving cylinder and return it to starting position.

17. In a hydraulic broaching machine, a pair of broaching cylinders, means for reciprocating said broaching cylinders simultaneously in opposite directions, a work moving cylinder adapted on reciprocation to moving work alternatively into working position with respect to said broach operating cylinders, fluid pressure means for automatically shifting said work moving cylinder to one end of its stroke between successive broaching strokes of the broaching cylinders to shift a workpiece into position to be broached by the cylinder next making its broaching stroke, and manually controlled means operable at any time to cause reverse and return the broaching cylinders to the ends of their strokes if they are intermediate the ends of their strokes and thereafter reverse the position of the work moving cylinder.

18. In a hydraulic broaching machine, a pair of broaching cylinders, means including a primary valve for effecting simultaneous reciprocation of said broaching cylinders in opposite directions, a work moving cylinder adapted on reciprocation to move workpieces alternatively into broaching position with respect to said cylinders, means including a secondary valve for reciprocating said work moving cylinder, a primary pilot circuit for actuating said primary valve, a secondary pilot circuit for actuating said secondary valve, a valve in said primary pilot circuit operable by and upon completion of a stroke of the work moving cylinder to shift the primary valve and effect a broaching stroke of the broaching cylinder into relation with which the workpiece was moved and a return stroke of the other broaching cylinder, a valve in said secondary pilot circuit operable by and upon completion of a stroke of one of said broaching cylinders to effect a shift of the secondary valve and a reversal of the position of the work moving cylinder.

19. In a hydraulic broaching machine, a pair of broaching cylinders, means including a primary valve for effecting simultaneous reciprocation of said broaching cylinders in opposite directions, a work moving cylinder adapted on reciprocation to move workpieces alternatively into broaching position with respect to said cylinders, means including a secondary valve for reciprocating said work moving cylinder, a primary pilot circuit for actuating said primary valve, a secondary pilot circuit for actuating said secondary valve, a valve in said primary pilot circuit operable by and upon completion of a stroke of the work moving cylinder to shift the primary valve and effect a broaching stroke of the broaching cylinder into relation with which the workpiece was moved and a return stroke of the other broaching cylinder, a valve in said secondary pilot circuit operable by and upon completion of the broaching stroke of one of said broaching cylinders and a return stroke of the other to effect a shift of the secondary valve and a movement of a workpiece into broaching position with respect to the other broaching cylinder.

20. In a hydraulic broaching machine, a pair of broaching cylinders, means including a primary valve for effecting simultaneous reciprocation of said broaching cylinders in opposite directions, a work moving cylinder adapted on reciprocation to move workpieces alternatively into broaching position with respect to said cylinders, means including a secondary valve for reciprocating said work moving cylinder, a primary pilot circuit for actuating said primary valve, a secondary pilot circuit for actuating said secondary valve, a valve in said primary pilot circuit operable by and upon completion of a stroke of the work moving cylinder to shift the primary valve and effect a broaching stroke of the broaching cylinder into relation with which the workpiece was moved and a return stroke of the other broaching cylinder, a valve in said secondary pilot circuit operable by and upon completion of a broaching stroke of one of said broaching cylinders to effect a shift of the secondary valve and a movement of a workpiece into broaching position with respect to the other broaching cylinder, and manually controlled means for reversing both pilot circuits to shift both the primary and secondary valve and effect automatic sequential reversal of said cylinders in reverse order to their previous order of movement.

21. In a hydraulic broaching machine, a source of fluid under pressure, a vertically movable broaching slide, a hydraulic piston and cylinder for operating said slide, a hydraulic motor for moving a workpiece into and out of broaching position, automatic control devices for controlling the flow of fluid to and from said cylinder and motor to move the broach and work successively through a cycle in which the motor advances the work to broaching position, the broaching slide moves downwardly on its broaching stroke, the motor retracts the work and the broaching slide is returned to its upper position, means to prevent advance of the work by said control means when the broaching slide is not in its fully returned upper position, and means operable automatically to fully return the broach to its upper position when said last mentioned means is acting to prevent advance of the work.

22. In a hydraulic broaching machine, a source of fluid under pressure, a vertically movable broaching slide, a hydraulic piston and cylinder for operating said slide, a hydraulic motor for moving a workpiece into and out of broaching position, and automatic control devices for controlling the flow of fluid to and from said cylinder and motor to move the broach and work successively through a cycle in which the motor advances the work to broaching position, the broaching slide moves downwardly on its broaching stroke, the motor retracts the work and the broaching slide is returned to its upper position, said automatic control devices including a conduit from said pressure source having connections to said cylinder and motor, and a valve in the fluid connection to said motor for blocking flow through said connection to the motor until the pressure in said conduit exceeds that required to return the broach to its fully returned upper position.

23. In a hydraulic broaching machine, a source of fluid under pressure, a vertically movable broaching slide, a hydraulic piston and cylinder for operating said slide, a hydraulic motor for moving a workpiece into and out of broaching position, and automatic control devices for controlling the flow of fluid to and from said cylinder and motor to move the broach and work successively through a cycle in which the motor advances the work to broaching position, the broaching slide moves downwardly on its broaching stroke, the motor retracts the work and the broaching slide is returned to its upper position, said automatic control devices including a device for controlling actuation of the motor, and means operable automatically upon actuation of said device in a direction to cause advance of the work into broaching position to render said device ineffective to cause advance of the work so long as the broaching slide is not in its fully returned position, said last named means being automatically effective to return said piston and cylinder and the broaching slide to their fully returned position.

24. In a hydraulic broaching machine, a source of fluid under pressure, a vertically movable broaching slide, a hydraulic piston and cylinder for operating said slide, a hydraulic motor for moving a workpiece into and out of broaching position, a hydraulic operating circuit connecting said source with said cylinder and motor and adapted to effect a cycle of successive movements of said broaching slide and workpiece in which the workpiece is advanced by the motor, the broaching slide is moved downward on its broaching stroke by the piston and cylinder, the workpiece is retracted by the motor and the broaching slide is returned to its upper position, said circuit including a valve means for controlling the direction of movement of said hydraulic motor, control means for shifting said valve means to a position in which it causes said motor to advance the work to broaching position, means rendering said control means ineffective to shift said valve to said position when the broaching slide is not in its uppermost position, and means automatically effective to return said broaching slide to its uppermost position when said last named means is rendering said control means ineffective to shift said valve.

25. In a hydraulic broaching machine, a source of fluid under pressure, a vertically movable broaching slide, a hydraulic piston and cylinder for operating said slide, a hydraulic motor for moving a workpiece into and out of broaching position, a hydraulic operating circuit connecting said source with said cylinder and motor and adapted to effect a cycle of successive movements of said broaching slide and workpiece in which the workpiece is advanced by the motor, the broaching slide is moved downward on its broaching stroke by the piston and cylinder, the workpiece is retracted by the motor and the broaching slide is returned to its upper position, said circuit including a valve means for controlling the direction of movement of said hydraulic motor, control means for shifting said valve means to a position in which it causes said motor to advance the work to broaching position, means rendering said control means ineffective to shift said valve to said position when the broaching slide is not in its uppermost position, means automatically effective to return said broaching slide to its uppermost position when said last named means is rendering said control means ineffective to shift said valve, and means operable after said valve has shifted and before the motor has completely advanced the work to broaching position to return the broaching slide to its uppermost position if it has left said position and to prevent further advance of said work during such return.

26. In a hydraulic broaching machine, a source of fluid under pressure, a pair of vertically movable broaching slides, a pair of piston and cylinder units for operating said slides respectively, a primary control valve for controlling the flow of fluid to said units to effect a simultaneous downward broaching stroke of one slide and an upward return stroke of the other slide, a work support movable between a position in which it presents a workpiece in position to be broached by one of said slides to a position in which it presents a workpiece in position to be broached by the other slide, means operable when either of said slides completes its broaching stroke to shift said work support to the position in which the work will be in broaching position with respect to the other slide, means automatically operable to delay shift of said work support to said last named position in the event that the other slide is not in its fully returned position until said other slide is in its fully returned position, and means automatically effective to cause full return of said broaching slide when said last named means is delaying shift of said work support.

27. In a hydraulic broaching machine, a pair of broaching cylinders, a normally closed circuit connecting one end of each of said broaching cylinders, means for supplying fluid under pressure alternatively to the opposite ends of said broaching cylinders to effect a simultaneous broaching stroke of one cylinder and a return stroke of the other cylinder followed by a simultaneous return stroke of said one cylinder and a broaching stroke of said other cylinder, means acting automatically between the completion of a broaching stroke of one of the cylinders and the institution of the broaching stroke of the other cylinder to feed a workpiece into position to be broached by said last mentioned cylinder, means for blocking said normally closed circuit at a point between said cylinders throughout the period between the completion of a broaching stroke of one of the cylinders and the institution of a broaching stroke of the other cylinder, means for applying fluid under pressure to the closed circuit end of the last mentioned cylinder throughout said period to effect a prefill of said normally closed circuit, and means to prevent operation of said automatic workpiece feeding means until said closed circuit end of said last mentioned cylinder is completely filled.

BENEDICT WELTE.